United States Patent [19]

Glassmeyer

[11] 4,211,444
[45] Jul. 8, 1980

[54] IMPACT RESISTANT BUMPER FOR VEHICLES

[75] Inventor: John J. Glassmeyer, Glenwood, Ill.

[73] Assignee: Pullman Incorporated, Chicago, Ill.

[21] Appl. No.: 912,684

[22] Filed: Jun. 5, 1978

[51] Int. Cl.² .......................................... B60R 19/04
[52] U.S. Cl. .................................................. 293/150
[58] Field of Search ............... 293/149, 150, 151–155, 293/120, 132

[56] References Cited

U.S. PATENT DOCUMENTS 3,924,888  12/1975  Butcher .................... 293/149 X
4,070,052  1/1978  Ng ............................. 293/120

Primary Examiner—Robert B. Reeves
Assistant Examiner—Gene A. Church
Attorney, Agent, or Firm—Richard J. Myers

[57] ABSTRACT

A light weight motor vehicle bumper including a box beam with stress reducing plates affixed within the beam at the central portions of the inner and outer walls of the beam. The stress plates each include a central portion of relatively constant cross-section and end portions of decreasing cross-section which effectively channel and distribute impact loads throughout the beam structure.

11 Claims, 5 Drawing Figures

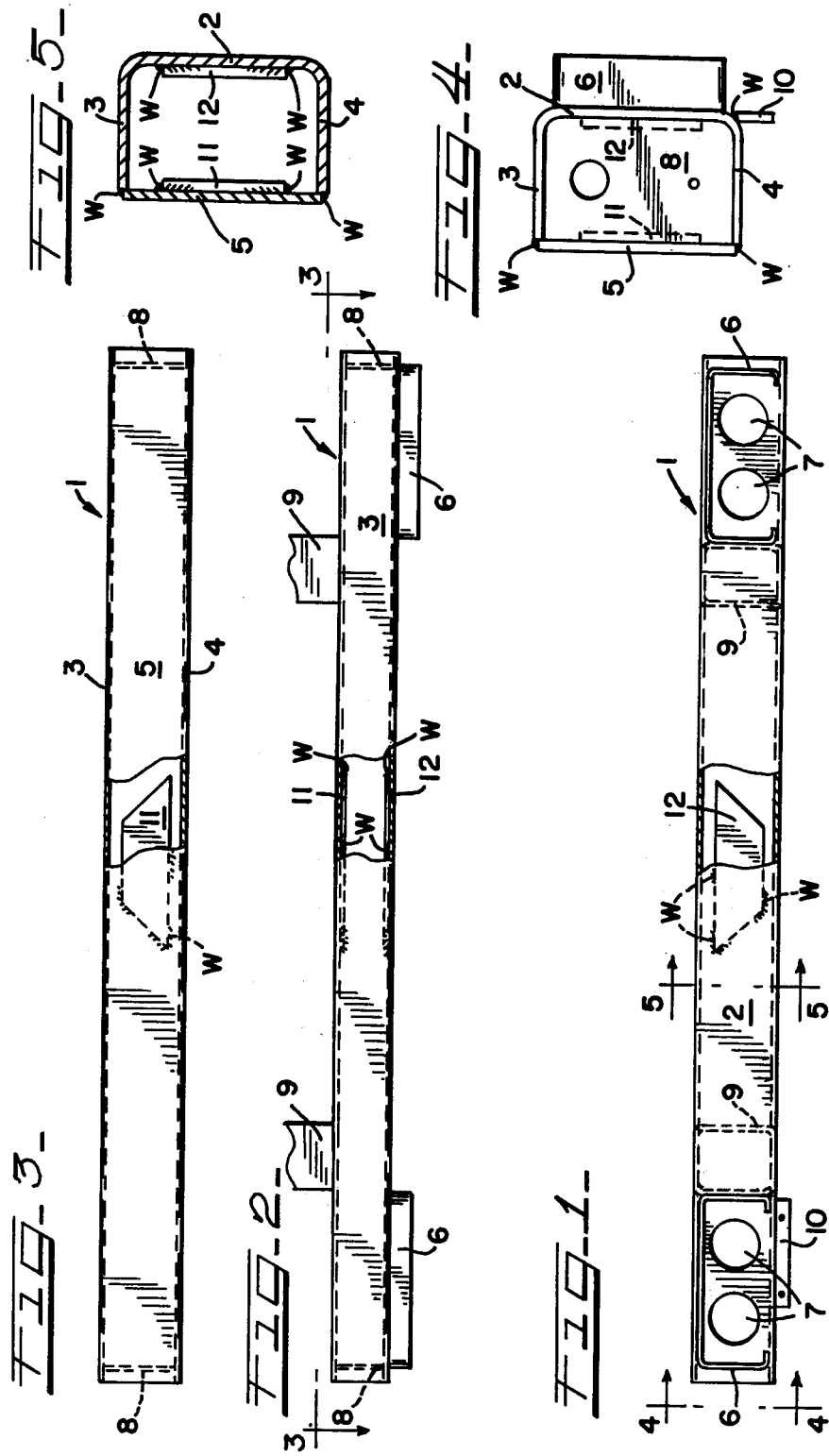

IMPACT RESISTANT BUMPER FOR VEHICLES

BACKGROUND OF THE INVENTION

1. Field of the Invention

This invention relates to the body structure of motor vehicles, and particularly to impact resistance bumpers for motor vehicles.

2. Description of the Prior Art

The prior air is typified by bumper constructions employing hollow beams rigidly affixed to a vehicle chassis so as to protect the body in the event of an impact. The light weight reinforced bumper construction of the present invention is an easily fabricated improvement over those arrangements.

SUMMARY OF THE INVENTION

The present invention is an impact resistant bumper suitable for use on motor vehicles and particularly highway cargo and tanker trailers. The bumper comprises a box beam of generally rectangular cross-section adapted for mounting to the chassis of a motor vehicle and includes portions suitable for the positioning of warning or running lights. Stress reducing means are provided in the beam to effectively channel and dissipate impact loads on the beam during normal field use which otherwise could lead to premature fracture or failure of the beam. The stress reducing means includes a pair of opposing plates integrally united or similarly rigidly affixed to the central portions of the inner and outer walls of the box section and extending outwardly therefrom so as to distribute and dump centralized impact loads through a greater portion of the beam, thus effectively minimizing localized stress concentrations and resulting fatigue or fracture of the bumper beam. It should be noted that because the bending moments and resulting stresses generated within the bumper attendant to centralized loading of the outer wall of the bumper are greatest at the center of the bumper, the stress plates may be bevelled or tapered away from the longitudinal centerline of the vehicle so as to reduce weight, cost, etc.

BRIEF DESCRIPTION OF THE DRAWINGS

FIG. 1 shows, in elevation and in partial cutaway, a view of that portion of the impact resistant bumper of the present invention which is situated away from the vehicle;

FIG. 2 shows a plan view in partial cutaway of the bumper as shown in FIG. 1;

FIG. 3 shows an elevational view in partial cutaway taken substantially along line 3—3 in FIG. 2;

FIG. 4 is an end view of the bumper along line 4—4 of FIG. 1; and

FIG. 5 is a cross-sectional view taken generally along line 5—5 of FIG. 1.

DESCRIPTION OF THE PREFERRED EMBODIMENT

Turning now to consideration of the drawings, there-shown is the novel load dissipating cargo vehicle bumper construction of the invention generally designated at 1. The bumper is substantially of closed box beam construction including a C-shaped channel section having an outer wall 2 and inwardly extending upper and lower wall portions 3 and 4, and an inner wall 5 rigidly affixed by welding or other well known means at its upper and lower edges to upper and lower walls 3 and 4, respectively. The bumper 1 includes protruding signal or warning light protectors or rigid channel-shaped hoods 6 arranged in a protective shielding fashion about light apertures 7 and bumper inserts or rigidifying webs 8 affixed within the end portions of the bumper beam. As can been seen from FIG. 2, the bumper 1 is rigidly affixed to the vehicle chassis members 9 which ultimately absorb bumper loads, it being noted that webs 8 and members 9 may be laterally aligned with the vertical channels of the hoods 6 so as to further rigidify and thus enhance the shielding or protective character thereof.

Again referring to the drawings, inner and outer stress reducing means exemplieied by the plates 11 and 12 are shown rigidly affixed by welding W to inner wall 5 and outer wall 2. Said plates are essentially centered along the longitudinal axis of the beam so as to reduce and abate fracturing bending and shearing impact loads on the bumper, it being noted that said plates are generally trapezoidally-shaped, each being vertically inverted relative to the other so as to optimumly channel impact loads within the beam.

From the foregoing it can be seen that the invention discloses an easily fabricated light weight bumper arrangement, which, because of its trapezoidal configuration, provides the additional cross-sectional area needed at the centermost portions of the bumper 1 to increase the section modulus of the bumper at that portion sufficiently to lower the stresses generated to within allowable limits. More particularly, because the stresses which develop in the bumper decrease at points increasingly distant from the bumper center, the trapezoidal configuration of the plates provides only the increase in cross-sectional area of the bumper 1 needed to keep generated stresses within allowable limits, thus minimizing both weight and material required while at the same time meeting the various loading and dimension guidelines set forth by the industry and government.

What is claimed is:

1. An impact-resistant bumper adapted for mounting on the chassis of a motor vehicle, comprising:
   - a bumper beam having inner and outer generally vertical wall portions and upper and lower generally horizontal wall portions extending therebetween to form a generally closed box beam construction of generally rectangular cross-section,
   - longitudinally extending means rigidly affixed to said vertical wall portions,
   - said means including plates having stress-attenuating shapes of tapered configuration toward each end, each plate being rigidly affixed to one of said vertical wall portions at the longitudinal central portion thereof.

2. The invention according to claim 1, and
   - each of said plates being non-symmetrical about its longitudinal axis and being vertically inverted with respect to the other.

3. The invention according to claim 1, and
   - a transversely extending rigidifying web being secured within each end of the bumper beam.

4. The invention according to claim 1, and
   - said outer wall portion being apertured to receive vehicle lights and an outwardly protruding channel-shaped hood being affixed to said wall in shielding relation about said aperture.

5. The invention according to claim 1, and each of said plates being essentially symetric about its transverse axis and having a central plate portion and beveled end portions extending outwardly therefrom toward respective ends of the bumper.

6. The invention according to claim 1, and
said means being disposed on the inner faces of said vertical wall portions.

7. The invention according to claim 1, and
said plates being of trapezoidal shape.

8. The invention according to claim 7, and
said plates being inverted with respect to each other on the respective inner and outer wall portions.

9. An impact-resistant bumper structure adapted for mounting on the chassis of a motor vehicle comprising:
elongated beam means including a pair of generally vertical wall portions and a pair of generally horizontal wall portions rigidly arranged in a box-section construction of generally rectangular cross-section, and
longitudinally extending plate means rigidly affixed to at least one of said vertical wall portions at the longitudinally central portion thereof,
said plate means having a shape of reduced cross-section toward each end thereof, thereby enhancing impact absorption properties of the bumper structure.

10. The invention according to claim 9, wherein
said plate means includes a pair of plates each affixed to respective vertical wall portions of said bumper structure.

11. The invention according to claim 10, and
each of said plates being non-symmetrical about its longitudinal axis and vertically inverted with respect to the other.

* * * * *